United States Patent [19]

Benton et al.

[11] Patent Number: 5,434,870
[45] Date of Patent: Jul. 18, 1995

[54] APPARATUS AND METHOD FOR VERIFYING THE AUTHENTICITY OF A CIRCUIT BOARD

[75] Inventors: Michael K. Benton, Malvern; An Le, Philadelphia, both of Pa.

[73] Assignee: Unisys Corporation, Blue Bell, Pa.

[21] Appl. No.: 870,525

[22] Filed: Apr. 17, 1992

[51] Int. Cl.$^6$ .............................................. G06F 11/10
[52] U.S. Cl. .................... 371/37.1; 371/37.2
[58] Field of Search ....................... 371/37.1, 37.2, 48, 371/57.1; 395/500; 364/265

[56] References Cited

U.S. PATENT DOCUMENTS

| | | | |
|---|---|---|---|
| 3,735,106 | 5/1973 | Hollaway . | |
| 3,898,631 | 8/1975 | Brown et al. . | |
| 4,193,061 | 3/1980 | Zoltai | 371/67.1 |
| 4,380,070 | 4/1983 | Steiner | 371/15.1 |
| 4,598,459 | 6/1986 | Klink et al. . | |
| 4,677,606 | 6/1987 | Ogata et al. . | |
| 4,750,136 | 6/1988 | Arpin et al. | 364/200 |
| 4,799,635 | 1/1989 | Nakagawa | 364/900 |
| 4,817,091 | 3/1989 | Katzman et al. | 371/9 |
| 5,146,172 | 9/1992 | Mehr-Ayin et al. . | |
| 5,164,944 | 11/1992 | Benton et al. | 371/40.1 |
| 5,319,598 | 6/1994 | Aralis et al. | 365/189.12 |

FOREIGN PATENT DOCUMENTS

| | | |
|---|---|---|
| 1161550 | 1/1984 | Canada . |
| 0041406 | 9/1981 | European Pat. Off. ..... G06F 11/00 |
| 0275448 | 7/1988 | European Pat. Off. ..... H04Q 3/545 |
| 2256717 | 12/1992 | United Kingdom ........ H04N 5/222 |

OTHER PUBLICATIONS

Glenda R. Robinson 'Result of the Desc Test Facility's Efforts to Improve the Quality of Electronic Replacement Parts' pp. 1276–1280.

Primary Examiner—Robert W. Beausoliel, Jr.
Assistant Examiner—Albert Decady
Attorney, Agent, or Firm—Robert R. Axenfeld; Mark T. Starr

[57] ABSTRACT

Disclosed is an apparatus and method for verifying the authenticity of a circuit board incorporated in a system. The method employs signal representing a unique identifier, such as a serial number and an associated error check code, to identify the circuit board. The identifier signal is passed from the circuit board to the system when the circuit board is initialized. To verify that a circuit board is authentic, the error check code (ECC) represented in the second part of the circuit board's identifier signal is verified. If the ECC is not correct then the circuit board is left unused. Next, the first part of the identifier signal (e.g. the serial number) is compared to the identifier signals for all other circuit boards mounted within the system. If a match of any two identifier signals is found, all circuit boards associated with the common identifier signal are left unused. If no duplicates are found and the ECC was correct, the circuit board is permitted to function.

10 Claims, 6 Drawing Sheets

APPARATUS AND METHOD FOR VERIFYING THE AUTHENTICITY OF A CIRCUIT BOARD

FIELD OF THE INVENTION

The present invention relates to an apparatus and method for determining the authenticity of a circuit board in a system. More specifically, the present invention determines whether a circuit board is authorized for use within a computer system.

BACKGROUND OF THE INVENTION

It is known to allow for replacement of circuit boards in a system which employs such boards, such as a computer system, or to permit the addition of circuit boards to enhance the functionality of such a system. Typically, the system will try to use such circuit boards without verifying that they are compatible with the system.

It is desirable to permit the system to verify that a circuit board is compatible and may be used with the system. The goal in such a case is to ensure that the circuit board meets specifications for the system such as timing and power consumption. Such verification avoids placing correct system operation at risk due to an improperly designed circuit board.

In addition, such circuit boards are not uniquely identified in the system. Because such circuit boards may be interchangeably plugged into other ports within the system, or moved to other systems, the lack of a means of uniquely identifying such circuit boards prevents the system from maintaining an accurate history log for each circuit board. Such a log is useful in determining the source of errors which occur using a circuit board.

Further, it is desirable to accomplish such verification without the need to update the hardware on subsequent approvals of new versions of compatible circuit boards.

In addition, such verification signals are sometimes imitated or counterfeited. It is therefore desirable to provide an apparatus and method that enables only authentic circuit boards to function within the system and will prevent circuit boards with identical identifier signals from being used.

SUMMARY AND OBJECTS OF THE INVENTION

It is a principle object of the present invention to provide an apparatus and method capable of determining the authenticity of a printed circuit board employed within a system. Authentic in this context means that the circuit board is genuine and authorized for use within the system. System refers to an apparatus which employs such circuit boards, such as a computer system.

Another object of the present invention is to provide an apparatus and method which uniquely identifies circuit boards to permit the identity of the circuit boards to be maintained within a system and between systems.

It is another object of the present invention to provide an apparatus and method which simply and efficiently implements the principle objects of the invention. Such a method should not require hardware nor software updates to systems once leave the manufacturer yet such an apparatus and method should permit new circuit boards to be added to the set of authentic circuit boards over time.

More specifically, it is an object of the present invention to accomplish the above objectives for use with daughter memory circuit boards within the memory system of a computer system. A computer system in this context includes a single computer or a plurality of computers which are interconnected.

The type of computer system in which the present invention is used comprises a main unit which includes a plurality of circuit board ports into which circuit boards may be plugged. To be considered authentic each circuit board must have associated with it a means for transmitting an identification signal to its computer system. This signal functions as a key for the circuit board.

Within the computer system there is provided a mechanism to perform a verification of the identification signal received from the circuit board. This mechanism acts as a lock for the given port such that if the identifier signal received is not acceptable, the circuit board plugged into the port will not be utilized by the computer system.

In accordance with the present invention the port into which the circuit board is plugged is only enabled if an authentic circuit board is plugged into said port. Therefore, the use of false or unauthentic circuit boards can be precluded.

In addition, the identifier signal received from an authentic circuit board is maintained within the system to identify the circuit board plugged into the given port. Subsequent errors or other information associated with the circuit board plugged into the given port are logged by the computer system using the associated identification signal for the circuit board.

Verifying the authenticity of a circuit board identification signal before permitting the circuit board to operate within the system creates a high degree of confidence that such identifier signals are unique and accurately track the events associated with a particular circuit board even if the board is moved to another computer system. This prevents the use of circuit boards with bogus identifier signals from destroying the integrity of this error reporting method.

The selected embodiment of the present invention incorporates a serial PROM and associated logic for transmitting said identifying signal for a circuit board. This PROM is programmed by the circuit board manufacturer with a unique identification signal prior to shipment of the circuit board. Such signals comprise a unique identifier and an associated error check code (ECC) for the given unique identifier. The ECC method used must be the same as that employed by the verification means incorporated in the computer system in which the circuit board is installed. In the preferred embodiment, such ECC method is the same as that used to perform error checking within the computer memory of said computer system during normal operation.

During initialization of the circuit board in the preferred embodiment, the board transmits to the computer system a signal representing said unique identifier and ECC code stored in the PROM. The system employs a verification means which checks that the ECC code is correct for the unique identifier. If not, then the port for the circuit board is logically disabled by the computer system.

Next, the unique identifier portion of the identification signal is compared with all other identifiers for the circuit boards plugged into the computer system. If any two identifiers match, the ports associated with the circuit boards with duplicate identifiers are disabled. If the identifier is unique and the ECC is correct, then the port is enabled and the circuit board is utilized by the system.

These and other objects, features and advantages of the present invention will become apparent from the following detailed description when read in conjunction with the accompanying drawings.

DESCRIPTION OF THE PREFERRED EMBODIMENT

Figure 1:
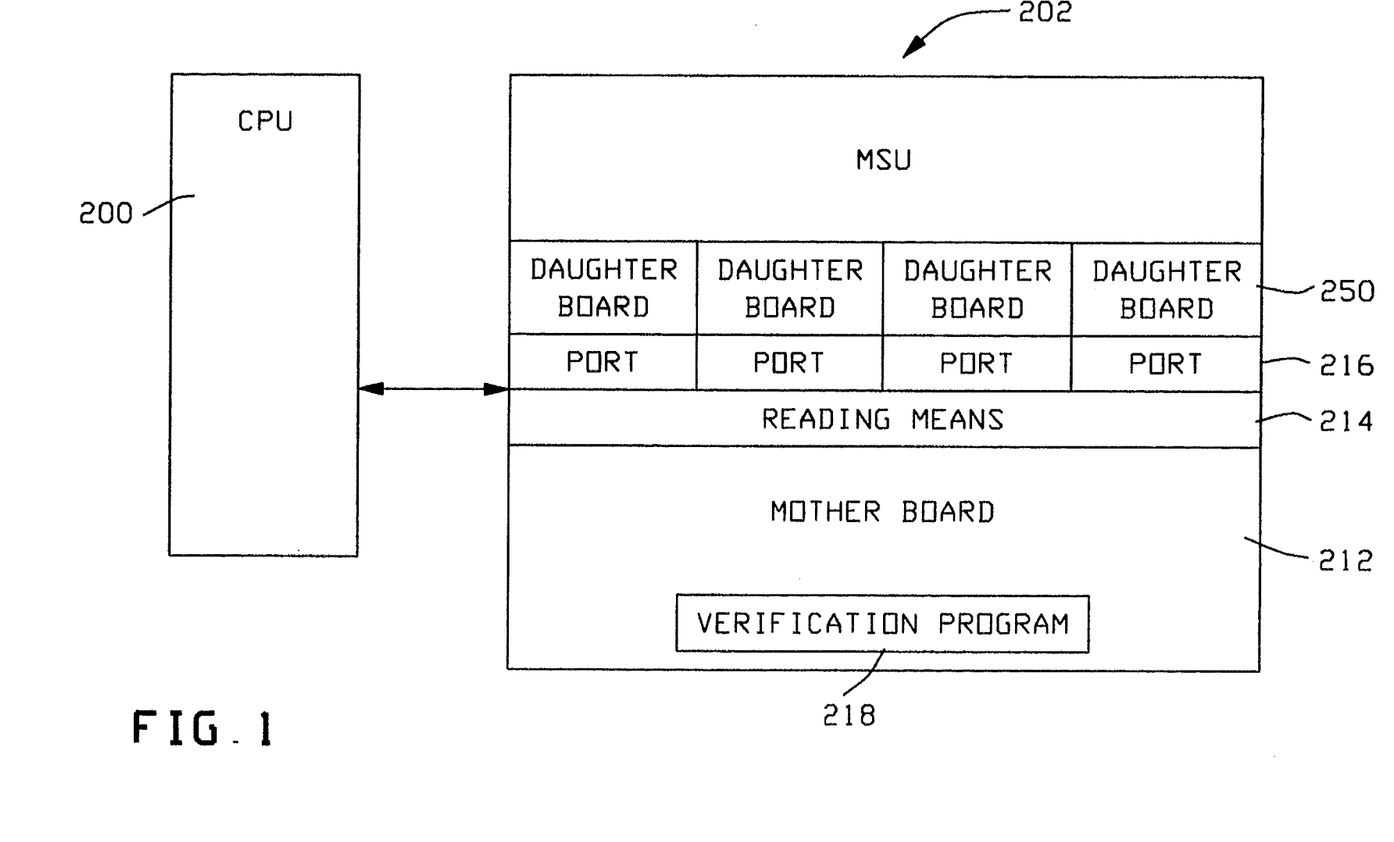
FIG. 1 shows a computer system in which the preferred embodiment of the present invention is incorporated.

FIG. 1 shows a computer system in which incorporates the present invention. The system comprises a central processing unit (CPU) 200 and memory system unit (MSU) main memory 202. MSU 202 includes at least one mother memory circuit board 212.

A plurality of such mother memory circuit boards comprise the minimum memory capacity of the main memory 202. Each mother memory circuit board has four circuit board ports 216. Each port may be used to couple a daughter memory circuit board 250 to the mother memory circuit board 212. Coupled to each of the circuit board ports 216 is a reading means 214 whose function is explained hereinafter. A daughter memory circuit board 250 is plugged into a mother memory circuit board 212 to expand the total capacity of the main memory 202.

The system includes a verification means which, in the preferred embodiment, comprises a verification program 218 which is resident in main memory 202 and executed by the CPU 200. Each of the circuit board ports 216 may be disabled on an individual basis responsive to the verification means. In this context, disabled means that the daughter memory circuit board 250 connected via the circuit board port 216 is not permitted to function with the rest of the system.

Figure 2:
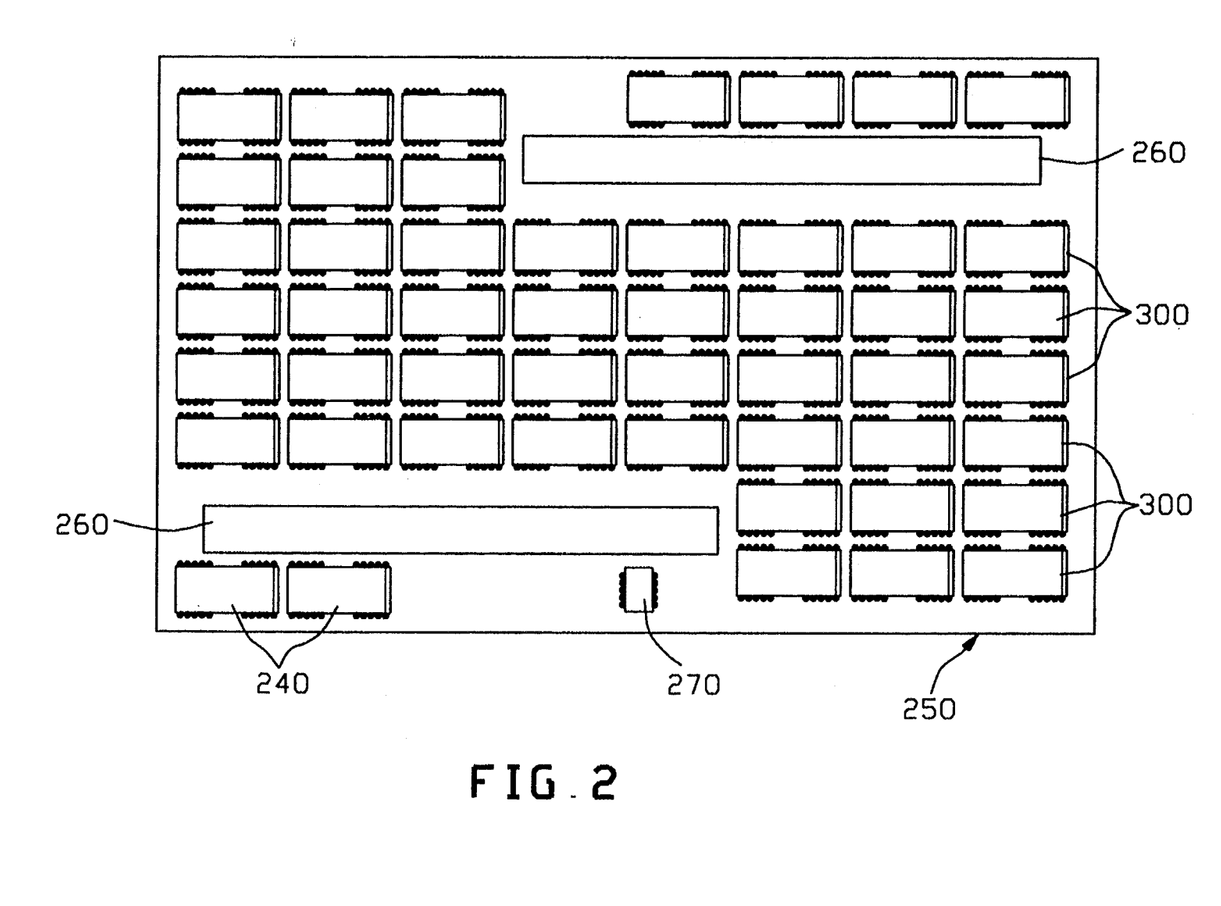
FIG. 2 is a drawing of a daughter circuit board used in the preferred embodiment incorporating the present invention.

FIG. 2 is a drawing of a daughter memory circuit board 250 used in a preferred embodiment incorporating the present invention. It includes a series of DRAM packages 300, an appropriate set of driver chips 240 to manage said DRAM packages 300, and a set of connectors 260 to permit a daughter memory circuit board 250 to be plugged into a mother memory circuit board 212. A PROM 270 is coupled to the daughter memory circuit board 250 in accord with the present invention.

Figure 3:
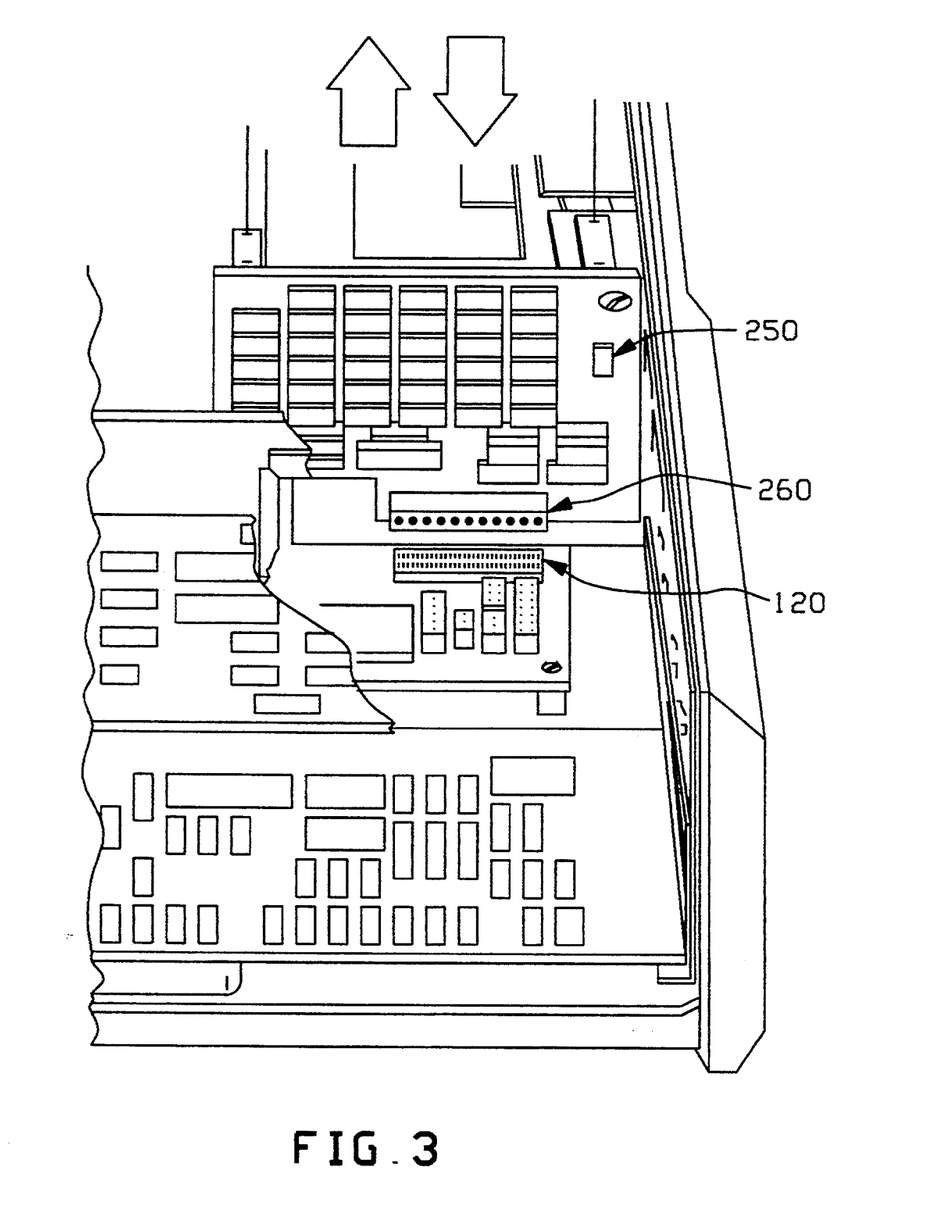
FIG. 3 shows an example of how a daughter memory circuit board plugs into a computer system.

FIG. 3 is a more detailed example of how a daughter memory circuit board 250 is plugged into a computer system. Note that connector 260 on daughter memory circuit board 250 is compatible with the system circuit board pins 120.

Figure 4:
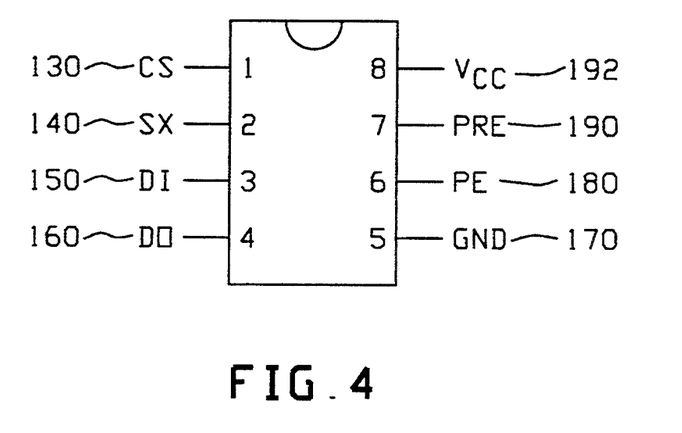
FIG. 4 is a drawing of a PROM used in the preferred embodiment of the present invention.

FIG. 4 is a drawing of the PROM 270 used in the preferred embodiment of the present invention. As shown in FIG. 2, the PROM 270 is located on the daughter memory circuit board 250. The PROM 270 used comprises a commercially available 8 pin dual in line package, such as part number NMC93CS46 sold by National Semiconductor, Inc. This includes chip Select 130, serial Data Clock 140, serial Data Input 150, serial Data Output 160, Ground 170, Program Enable 180, Protect Register Enable 190 and Power Supply 192.

Figure 5:
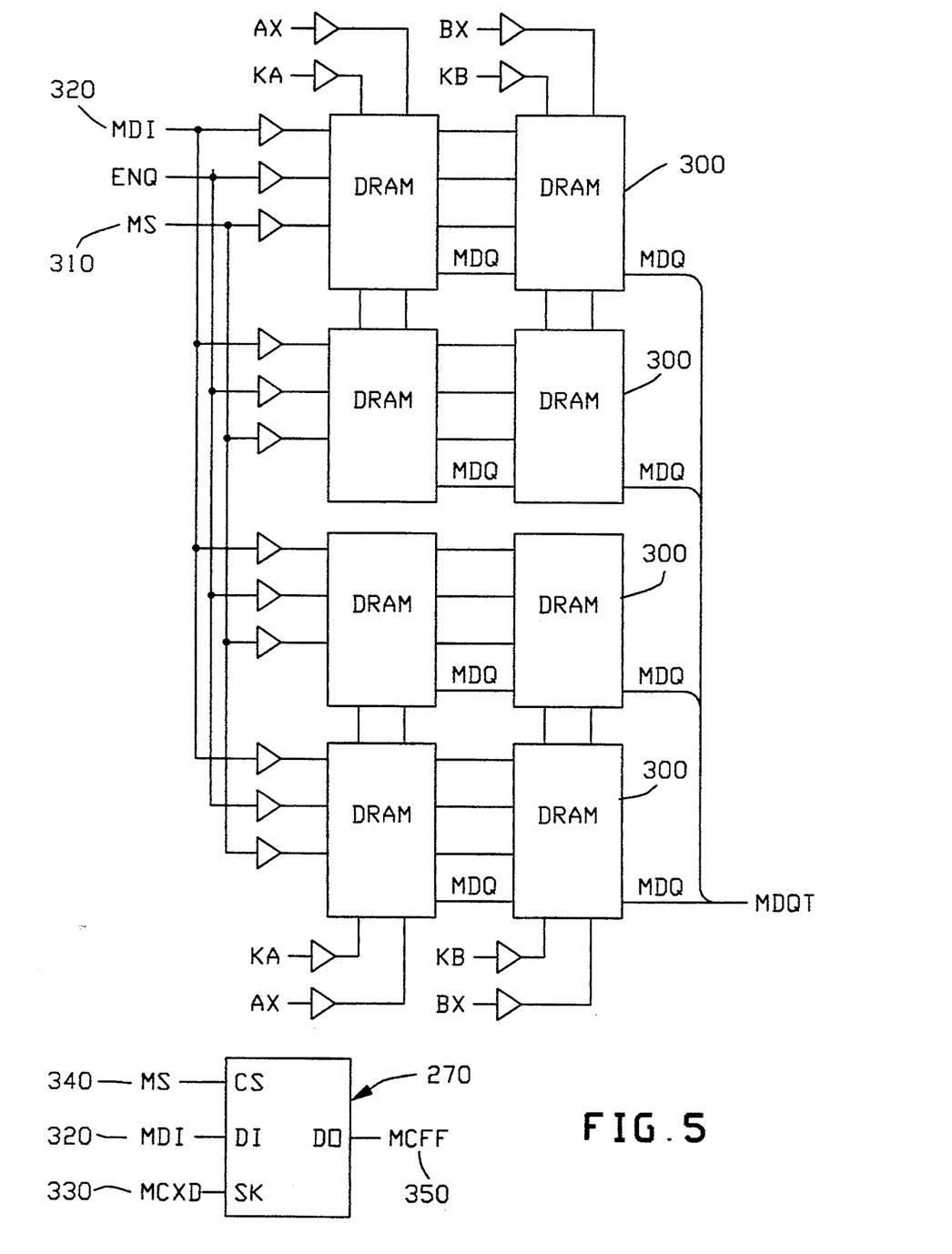
FIG. 5 is a functional diagram of the memory circuit board used in the preferred embodiment which includes the PROM used to store the identification signal.

FIG. 5 shows a functional diagram of the preferred daughter memory circuit board 250 which includes a plurality of DRAM packages 300 and a PROM 270. When this daughter memory circuit board 250 is assembled, the PROM 270 is electrically connected to the circuit board 250. This PROM 270 is programmed with an identification signal for the board 250.

The Data In pin 150 for PROM 270 is tied in common with Memory Data In signal on the daughter memory circuit board 250 which corresponds to the Memory Data In (MDI) 320 signal on the mother memory circuit board. This signal 320 enters the daughter memory circuit board 250 on connector B 260.

The Shift Clock input 140 of the PROM 270 enters the daughter memory circuit board 250 on connector B 260. In the preferred embodiment, there is one memory controller for each set of four daughter memory circuit boards 250 plugged into the mother memory circuit board 212. For each memory controller, a single clock driver (MCKD) 330 drives this Shift Clock pin 140 for all 4 daughter memory circuit boards 250. This signal 330 can be independently controlled by the mother memory circuit board 212 and is dedicated to the PROM 270. This permits control of the PROM 270 separate from normal operations. There is a separate signal 330 for each memory controller in the system and the signal cannot be accessed during normal system operation.

The Chip Select pin 130 is tied in common with the Memory Select signal (MS) 340 on the daughter memory circuit board 250. This corresponds to the mother circuit board signal Memory Select which enters the daughter memory circuit board 250 on connector B 260. The Chip Select pin 130 is held active for the duration of accessing the PROM 270 contents.

The Data In 150 is sourced from the memory controller circuitry via the DRAM data bus driving into the circuit board. The Data Out 160 from the PROM 270 loads into flip-flops (MCFF) 350 in the memory controller. There are 4 flip-flops on each memory controller, one for each daughter memory circuit board 250. This permits the computer system to read all 4 daughter memory circuit boards 250 simultaneously.

The Program Enable pin 180 is tied to a daughter memory circuit board connector pin which is not used in the computer system. This allows specialized test and programming equipment to program the PROM 270 using the Program Enable pin 180 and prevents it from being accidently erased or altered in normal operation.

Figure 6:
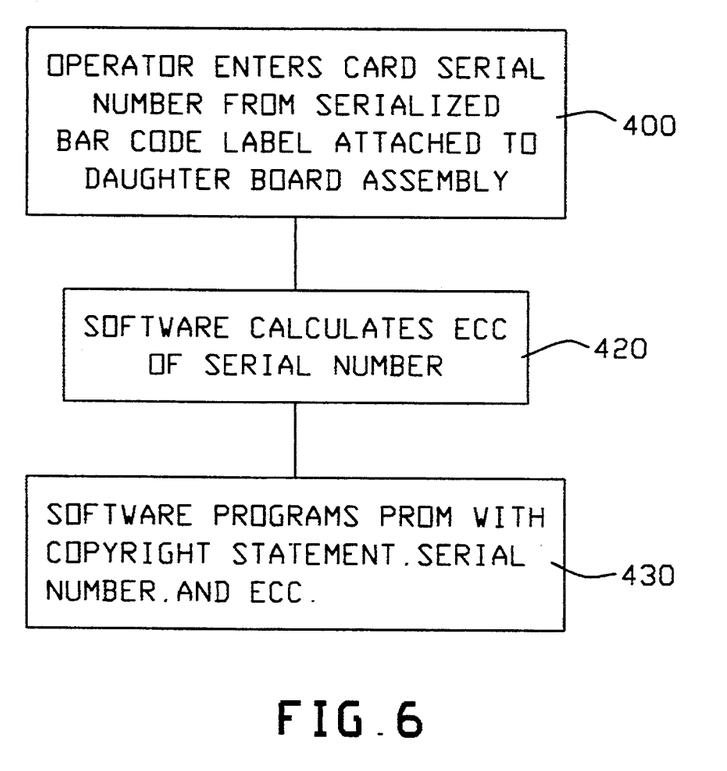
FIG. 6 shows the steps employed in programming a PROM employed in the preferred embodiment.

FIG. 6 shows the steps employed to program the PROM 270. As part of the manufacturing process for the circuit board 250, the card serial number shown on the serialized bar code label attached to the daughter memory circuit board assembly is entered into a manufacturing workstation by an operator 400 to be used as the unique identifier for the daughter memory circuit board 250. The software which programs the PROM 270 is of a standard type known in the art and is executing on a system to which the circuit board 250 is connected during the manufacturing. The software is used to calculate a signal representing the correct error check code (ECC) for the given unique identifier 420 based on the ECC method employed by the verification method in use. In the preferred embodiment, this is the same ECC method employed by the memory management subsystem of the computer system on which the daughter memory circuit board 250 will be employed. Next, the PROM 270 is programmed with a signal representing data 430 which, for example, may include a copyright notice, a serial number, and the ECC code as calculated in the previous step.

The verification means includes a verification program 218 which resides in main memory 202 and is executed as part of the initialization of a daughter memory circuit board 250. The verification means functions as the "lock" in this embodiment. The PROM 270 mounted on a daughter memory circuit board 250 functions as a "key". During initialization, the verification program 218 instructs the system to read the identification signal burned into the PROM 270.

Figure 7:
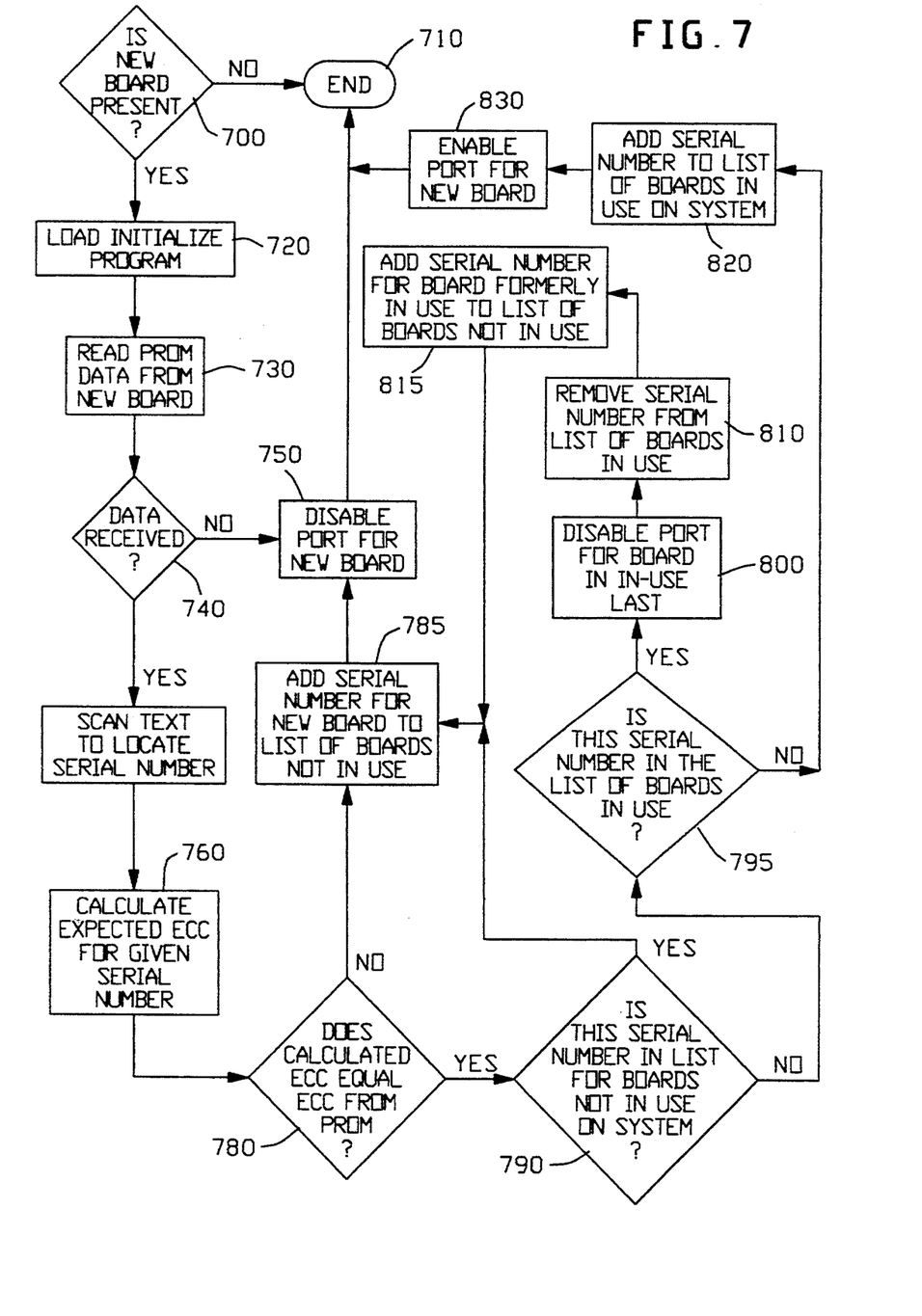
FIG. 7 shows the steps performed by the verification program employed in the present invention.

FIG. 7 shows the steps performed to initiate the verification program 212 as well as the steps performed by the program to complete the verification. At step 700 the Data Out pin 160 is checked to determine if a "1" is present. If not, then the process ends 710. If there is a daughter memory circuit board 250 present as indicated by a "1" on Data Out 160, the verification program 218 is loaded 720. The verification program 212 first reads 730 the signal from the PROM 270 on the daughter memory circuit board 250. A check is then made to see if a signal was received 740. If not, the port is disabled 750 and the program 218 ends 710.

If a signal is received, the beginning of the unique identifier is located within the signal 760. The unique identifier is used to calculate the expected error correction code (ECC.) for that identifier 770. Next 780, the calculated ECC is compared to the one read from the PROM 270.

If the ECC codes are not equal, the daughter circuit board's unique identifier is added to the list of daughter circuit boards 250 not in use 785, the circuit board port 216 for the circuit board 250 is disabled 750, and the process ends 710.

If the ECC codes are equal, the unique identifier is compared to each member in the list of identifiers for other circuit boards installed in the system but not in use 790. If the unique identifier read from the PROM 270 matches any of the identifiers in the list, the unique identifier for the new circuit board is added to the list of circuit boards not in use 785, the circuit board port 216 for the daughter memory circuit board 250 is disabled 750, and the process ends 710.

If the unique identifier does not appear in the list of identifiers for circuit boards not in use, the unique identifier is then compared to those in the list of identifiers for other circuit boards in use on the system 795. If the unique identifier read from the PROM 270 matches any of the identifiers in the list, the circuit board port 216 associated with the daughter circuit board 250 for the number found in the list is disabled 800. The identifier which matched the unique identifier from the PROM 270 is removed from the list of circuit boards for the system in use 810 and added to the list of circuit boards not in use 815. The unique identifier for the daughter circuit board 250 is added to the list of circuit boards not in use 785, the circuit board port 216 for the daughter circuit board 250 is disabled 750, after which processing ends 710.

If the unique identifier from the PROM 270 does not match any of the identifiers for other circuit boards on the system, then the new unique identifier is added to the list for circuit boards in use on the system 820. Finally, the circuit board port 216 for the daughter circuit board 250 is enabled for use 830 after which processing ends 710.

As mentioned earlier, the ECC method used in the present invention is the same as that used by the computer system to perform error checking during normal operation within the main memory 202. In the preferred embodiment, this method is used by the check bit generator in the computer system. Such system may be a network of exclusive "or" gates such as is shown in U.S. Pat. No. 4,817,091 to Katzman, et al, which is hereby incorporated by reference. The check bit generator shown in the Katzman patent differs from that used in the present invention in that only odd parity trees are used in the present embodiment. Such use is further detailed in a patent application filed Jun. 8, 1990, assigned to the same entity as is the present application and given Ser. No. 07/535,757 which is hereby incorporated by reference.

Error tracking for circuit boards in the system is improved using the present invention. When a circuit board error occurs, the unique identifier for the board is entered in the error log with the report of the error or other occurrence. This eliminates the need to manually correlate memory circuit board errors and specific circuit boards in the system.

Unique identification of each circuit board correlates errors so that both the error and the unique identifier of the offending component appear in the same error report or message. Note that this is especially useful when there are many interchangeable circuit boards in the system which can be reconfigured over time or moved to other computer systems.

While the above described embodiment employs memory circuit boards plugged into a mother memory circuit board it will be recognized from the above by those skilled in the art that such an apparatus and method would be equally applicable to other electronic systems where circuit boards are employed. For example, the use of expansion peripheral circuit boards could be verified by use of this apparatus and method.

Note also, that the apparatus and method permits circuit boards to be added to the approved list over time without affecting, or requiring an update to, the host system. So long as a unique identifier is used and accompanied by the correct ECC code for that number, systems employing this apparatus and method will be able to use the circuit board.

What is claimed:
1. An apparatus comprising:
at least one circuit board port disabled by default;
at least one circuit board, coupled with said circuit board port;
storage means, residing on said circuit board, for storing an identification code including a code representing a unique identifier and a code representing a first error correction code associated with said unique identifier;
reading means, coupled with said circuit board port, for reading said identification code stored in said storage means;

verification means, coupled with said reading means, for verifying that said identification code is unique and for calculating a second error correction code from said unique identifier and comparing said first and second error correction codes in determining if said identification code is valid; and control means, coupled with said circuit board port and responsive to said verification means, for enabling said circuit board port if said identification code is unique and valid.

2. The apparatus of claim 1 wherein said verification means comprises:

memory system;

verification software program stored in said memory system;

processor coupled with said memory system for executing said verification software program.

3. The apparatus of claim 2 wherein:

said signal representing said error correction code is determined by a method which is the same said method employed to perform error checking within said memory system during normal operation.

4. The apparatus of claim 1 wherein said storage means includes a PROM.

5. The apparatus of claim 1 wherein said circuit board comprises a daughter memory circuit board.

6. A method of determining whether a first circuit board which is coupled with an initially disabled first circuit board port in a system is authorized for use in said system comprising the steps of:

reading from a storage residing on said first circuit board an identification code, said identification code including a code representing a unique identifier for said circuit board and a code representing a first error correction code associated with said unique identifier;

calculating an expected error correction code associated with said unique identifier;

comparing said expected error correction code to said first error correction code and not enabling said first circuit board port if said codes are equal;

comparing said signal representing a unique identifier to each member of a list of signals representing identifiers of other boards plugged into said system and not enabling said first circuit board port if said code representing a unique identifier is found to equal any member of said list;

disabling a second circuit board port if said code representing a unique identifier is found to equal any member of said list wherein a second circuit board which is associated with said member of said list which equaled said code representing a unique identifier is coupled with said second circuit board port;

adding said code representing a unique identifier to said list of identifiers for circuit boards plugged into said system; and enabling said first circuit board port if said code representing a unique identifier did not equal any member of said list and said codes representing error correction codes were equal.

7. The method of claim 6 wherein the method used to calculate said error correction code is determined by a method which is the same said method employed to perform error checking within said system during normal operation.

8. A method of identifying a circuit board coupled with a system via an initially disabled circuit board port, said method comprising the steps of:

reading from a storage residing on said circuit board an identification code including a code representing a unique identifier and a code representing a first error correction code associated with said unique identifier;

verifying that said identification code is unique within said system;

verifying that said identification code is not in error;

enabling said circuit board port if said identification code is unique-and not in error;

disabling said circuit board port if said identification signal is not unique within said system or if said identification signal is in error; and employing said identification code to report information associated with said circuit board if said circuit board port is enabled.

9. The method of claim 8 wherein said steps of verifying that said identification signal is not in error comprises the steps of:

calculating a signal representing an expected error correction code associated with said unique identifier;

comparing said signal representing a calculated error correction code to said signal representing an error correction code read from said storage.

10. The method of claim 9 wherein the method used to calculate a signal representing an expected error correction code is the same method employed to perform error checking within said system during normal operation.

* * * * *